Jan. 11, 1949. L. SPRARAGEN 2,459,120
METHOD OF MAKING WEATHER STRIPS
Original Filed March 23, 1942
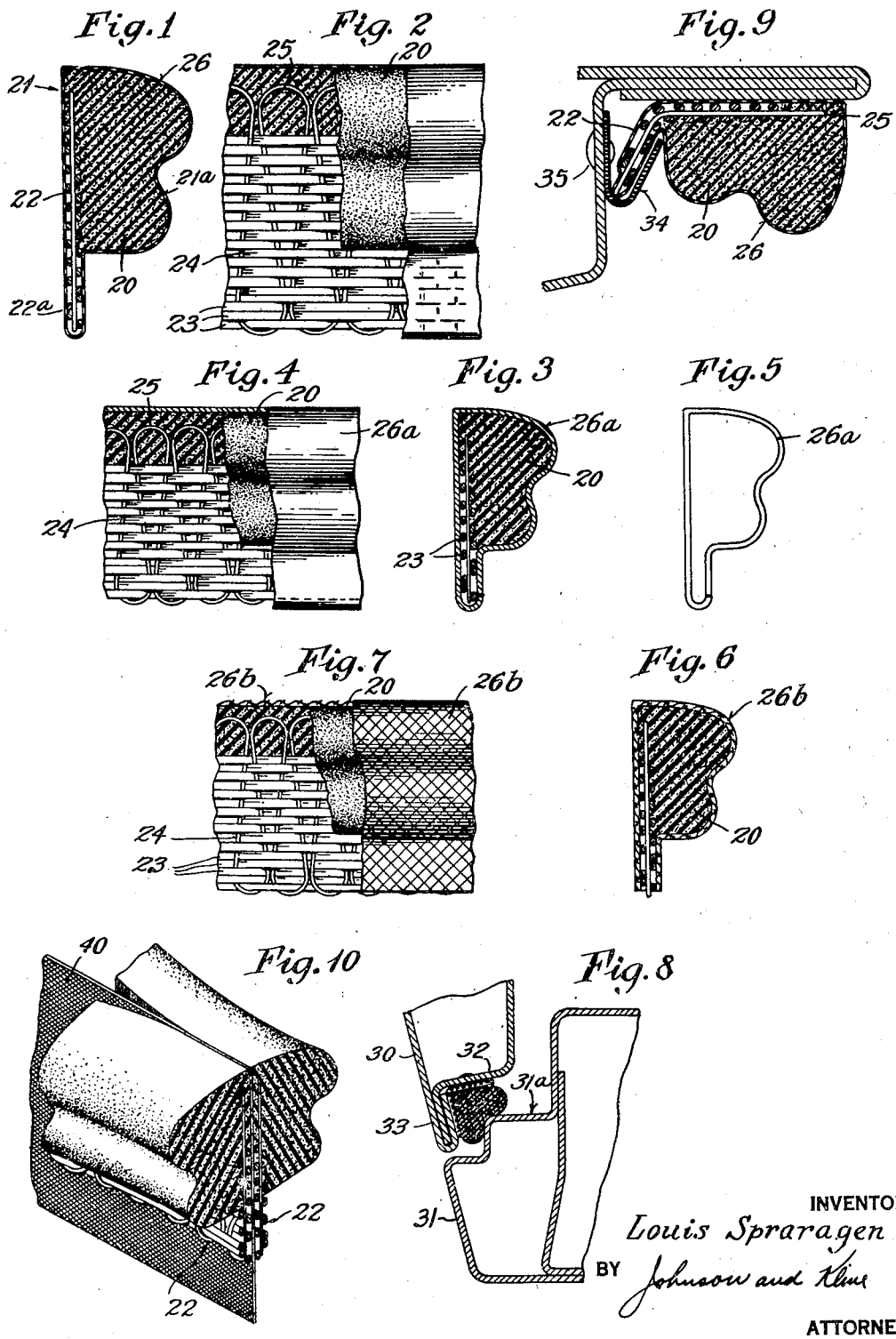
INVENTOR
Louis Spraragen
BY Johnson and Kline
ATTORNEYS Patented Jan. 11, 1949

2,459,120

UNITED STATES PATENT OFFICE 2,459,120

METHOD OF MAKING WEATHER STRIPS

Louis Spraragen, Bridgeport, Conn., assignor to Bridgeport Fabrics, Inc., Bridgeport, Conn., a corporation of Connecticut Original application March 23, 1942, Serial No. 435,782. Divided and this application September 28, 1945, Serial No. 619,228

4 Claims. (Cl. 154—84)

This invention relates to the method of making an improved beading or sealing strip of a type particularly adapted for exterior seals for closure members.

This application is a division of my copending application, Serial No. 435,782, filed March 23, 1942, now Patent No. 2,400,470 granted May 14, 1946.

Heretofore, it has been proposed to cement or otherwise adhere a strip of sponge rubber about the closure member so as to be located in position to seal an opening when the closure member is moved to closed position. Such devices are often used to seal the doors of automobiles and are subject to rains and other weather conditions. However, sponge rubber, being porous, retains the moisture, causing rust, and often becomes loosened from its mounting.

In an effort to overcome these difficulties, hollow sealing members were melded from rubber material, since previous covers for the sponge were ineffective due to bunching when the sponge was bent. While these seals were not porous and were sufficiently rigid to be anchored by clips to the door, they were subject to frequent breakdowns due to the flexing of the walls of the hollow structure.

The strip made according to the present invention obviates these difficulties by providing a durable beading strip which has the resilient properties of sponge rubber and is tough and impervious to moisture and capable of being securely anchored in position. This is accomplished, according to the present invention, by a bead preferably of sponge rubber having a resilient bendable attaching flange and the whole enclosed and sealed with a tough, impervious cover secured throughout the surface thereof.

In the preferred form of the invention, the bead is made with at least one flat surface to which is secured the attaching strip or flange. The flange is provided with a plurality of interstices and/or loops along one edge thereof and the rubber of the bead extends into the interstices and the loops and interlocks therewith.

In order to make the strip impervious to moisture, the present invention completely encloses the bead and flange with a tough, resilient cover which is securely and integrally bonded to the surface so as to be a part thereof. The cover may be a coating of said material, a deposit from a dispersion of latex, or may be preformed, as by extrusion, and secured to the bead and flange.

In some installations, the beading strip will not be exposed to the weather, and, in such cases, it may be covered with a textile covering material securely anchored thereon.

Other features and advantages of the invention will become apparent when considered in connection with the drawing, in which:

Figure 1 shows a transverse sectional view of one form of the bead of the present invention.

Fig. 2 shows a front view, partly in section, of the form of the invention shown in Fig. 1.

Fig. 3 is a view similar to Fig. 1, showing another form of my invention embodying a preformed cover.

Fig. 4 is a view similar to Fig. 2 showing the elements of the form of the invention shown in Fig. 3.

Fig. 5 shows an end view of the preformed cover.

Fig. 6 is a view similar to Fig. 1, showing another form of the invention embodying a fabric cover.

Fig. 7 is a view similar to Fig. 2 of the form of the invention shown in Fig. 6.

Fig. 8 shows a partial sectional view of the door and door jamb having the seal of the present invention thereon.

Fig. 9 shows a detail sectional view of the door with the seal partially installed.

Fig. 10 shows a view of the strips showing the process of making the same.

The seal made in accordance with the present invention comprises a solid bead 20 of flexible resilient material, preferably sponge rubber.

The bead has at least one substantially flat surface 21 and a contacting face 21a. An attaching strip or flange 22 of bendable resilient material is secured to the surface 21 to extend thereover.

As herein illustrated, the attaching flange comprises textile warps 23 and bendable resilient wefts 24 extending therethrough and projecting beyond one edge thereof to form a plurality of loops 25.

As is shown in Fig. 1, the bead material enters into the interstices of one face of the woven attaching flange and also passes through and interlocks with the loops at the edge of the flange, so that the flange is securely anchored to and overlies the flat surface of the bead.

A portion 22a of the flange extends below the bottom of the bead and forms the means for mounting and attaching the bead in position, as will be explained.

While the shape of the bead may be varied as desired, it is herein illustrated as having a contour which is substantially B-shaped, and the attaching flange is secured to the back of the bead.

The bead and flange are provided with a cover of tough, impervious, flexible material, and may be treated with a suitable bonding agent or compound, if necessary, in order to cause the cover material to adhere throughout the surface thereof.

In the form of the strip shown in Fig. 1, the bead and flange are impregnated with a suitable bonding compound and the cover is then formed by depositing a thin layer 26 directly thereon from a dispersion of latex. This provides a very thin skin over the sponge rubber bead and the attaching flange and seals them against the entry of any moisture. The cover, being bonded throughout the surface of the bead and flange, becomes, in effect, a part thereof and bends and yields with the bead and flange without any bunching.

While the present seal may be used with closures of various types, it is herein illustrated, in Figs. 8 and 9, as applied between an automobile door 30 and a jamb 31 therefor.

The door, as is best shown in Fig. 8, is provided with an edge portion 32 and an outwardly extending flange 33 which overlies and cooperates with a shoulder 31a on the jamb to close the opening defined thereby.

The outer seal is mounted in the corner formed between the edge and the flange, with its contact face 21a in position to engage and cooperate with the shoulder on the jamb to seal the opening therebetween. It is held in this position by an attaching means which may comprise the usual clip passing through apertures in the flange and door edge, a series of individual clamps, or a channel-shaped member 34, as shown in Fig. 9, secured by riveting, welding, or other suitable fastening means 35 to the edge of the door adjacent the base of the flange. In mounting the outer seal, the projecting portion 22a of the attaching flange is inserted into the opened channel, as shown in Fig. 9. The channel is then closed into the position in which it grips the projecting flange and clamps it to the edge of the door. In doing this, the projecting portion of the flange is bent and the flat bottom of the B-shaped portion of the bead moves into position, shown in Fig. 8, wherein it overlies and completely conceals the attaching member 34.

As the attaching flange is bent, its resiliency will cause the flat back portion 21 to be urged into and maintained in tight engagement with the projecting flange on the door.

If the seal is to be subjected to severe wear, the heavy duty seal of the present invention, as shown in Figs. 3 through 5, may be employed. In this form of the invention, the bead and attaching strip are as previously described, but the cover comprises a heavy layer 26a of resilient material, preferably rubber. The cover is preformed to the shape of the exterior of the bead and flange, as shown in Fig. 5 by extruding or molding it.

The bead and flange may be provided with a suitable adhesive or bonding agent and the cover assembled thereon and secured to the surface thereof, or the cover may be extruded directly on the bead and flange and vulcanized directly thereto.

This cover completely encloses and seals the strip and adheres to the entire surface of the bead and flange to flex therewith. Since the cover is preformed to the shape of the core, it will be devoid of internal stresses which would be produced if the cover was folded up from a flat sheet of rubber material and will, consequently, yield with the strip without undue bunching or buckling during the installation and use thereof.

Under some circumstances, the strip may be used as an interior seal or for decorative purposes and will not be subject to weather conditions. In this case, it can be covered with a fabric, preferably a textile fabric 26b, as shown in Figs. 6 and 7, which may be cemented, stitched or otherwise secured in position therearound.

While the cover materials have been indicated as being of latex, rubber and fabric, it is to be understood that other suitable synthetic rubbers, resins or compositions, which produce a flexible, impervious layer, may be substituted therefor.

In making up the beading strips according to the present invention, two beads may be formed at the same time. This is accomplished by employing a separator strip of Holland cloth 40 or other suitable material, to which rubber does not readily adhere, and assembling on each side thereof an attaching flange 22 as shown in Fig. 10. The bead is then molded about the top of the assembled strips so as to extend the same amount on each side of the separator strip and be symmetric with respect thereto. The rubber will extend through the loops of the flanges and interlock with and cover the same, but the separator strip will protect one side of the flange and keep it free from rubber.

After the bead has been completely molded and cured, the separator strip is removed by a stripping or peeling operation, leaving a flat surface including the uncovered portion of the flange.

The foregoing can be accomplished with strips of predetermined length or in a continuous process wherein a continuous separator strip is associated with continuous lengths of attaching flange material and the assembly passed through a continuous molding machine which will form the beads thereon.

After the beads and attaching flanges are separated, they may be provided with the various above-noted covers as required. In doing this, they are treated with a bonding agent or adhesive, if necessary, and the cover formed thereabout, by coating, depositing a layer of latex thereon from a dispersion thereof, or securing a fabric therearound, as required.

Variations and modifications may be made within the scope of this invention and portions of the improvements may be used without others.

I claim:

1. In the method of forming a weather strip, the steps of placing an attaching flange on each side of a separator strip; molding a bead of sponge rubber about one edge of the assembly so that the bead extends equally on each side of the separator strip and is symmetrical with respect thereto; removing the separator strip and separating the flanges and half bead molded thereto; and enclosing each of the beads and flanges with a cover material.

2. In the method of forming a weather strip, the steps of placing an attaching flange on each side of a separator strip; molding a bead of sponge rubber about one edge of the assembly so that the bead extends equally on each side of the separator strip and is symmetrical with respect thereto; removing the separator strip and separating the flanges and half bead molded thereto; and enclosing each of the beads and flanges with an impervious, flexible cover of rubber material bonded to the surface of the beads and flanges and completely sealing the same.

3. The method of forming a continuous weather strip, the steps of placing a continuous length of attaching flange on each side of a continuous separator strip, passing the assembly through a bead-forming means and molding a bead of sponge rubber about one edge of the assembly so that the bead extends equally on each side of the separator strip and is symmetrical with respect thereto; removing the separator strip and separating the flanges and half bead molded thereto; and enclosing the beads and attaching flanges with cover material.

4. The method of forming a core for a weather strip, comprising the steps of placing an attaching flange on each side of a separator strip; molding a bead of sponge rubber about one edge of the assembly so that the bead extends equally on each side of the separator strip and is symmetrical with respect thereto; and removing the separator strip and separating the flanges and half bead molded thereto.

LOUIS SPRARAGEN.

REFERENCES CITED

The following references are of record in the file of this patent:

UNITED STATES PATENTS

| Number | Name | Date |
| --- | --- | --- |
| 1,546,573 | Edison | July 21, 1925 |
| 1,808,582 | Taylor | June 2, 1931 |
| 1,931,333 | Taylor | Oct. 17, 1933 |
| 2,352,083 | Detjen | June 20, 1944 |